US010636081B2

(12) United States Patent
Corley et al.

(10) Patent No.: US 10,636,081 B2
(45) Date of Patent: *Apr. 28, 2020

(54) METHOD, SYSTEM, AND COMPUTER-READABLE STORAGE MEDIUM FOR UTILIZING EXCESS RESOURCE CAPACITY FOR TRANSCODING MEDIA

(71) Applicant: Amazon Technologies, Inc., Reno, NV (US)

(72) Inventors: Jonathan B. Corley, Seattle, WA (US); Tal Saraf, Seattle, WA (US); Bradley E. Marshall, Bainbridge Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 496 days.

This patent is subject to a terminal disclaimer.

(21) Appl. No.: 15/339,460

(22) Filed: Oct. 31, 2016

(65) Prior Publication Data

US 2017/0046778 A1 Feb. 16, 2017

Related U.S. Application Data

(63) Continuation of application No. 13/465,944, filed on May 7, 2012, now Pat. No. 9,483,785.

(51) Int. Cl.
*G06Q 30/00* (2012.01)
*G06Q 30/08* (2012.01)
(Continued)

(52) U.S. Cl.
CPC ......... *G06Q 30/08* (2013.01); *G06Q 30/0611* (2013.01); *G06Q 30/0613* (2013.01); *H04L 29/08549* (2013.01); *H04L 47/82* (2013.01)

(58) Field of Classification Search
CPC .................................................. G06Q 30/0611
(Continued)

(56) References Cited

U.S. PATENT DOCUMENTS 5,541,852 A  7/1996 Eyuboglu et al.
6,732,332 B1 5/2004 Borysewcz et al.
(Continued)

OTHER PUBLICATIONS

Anonymous, Altair Introduces Advanced Scheduling Features with PBS Professional(TM) 9.2: Eligible time, tunable formula and standing reservations help customers achieve higher ROI, May 20, 2008, PR Newswire (Year: 2008).*

(Continued)

*Primary Examiner* — Brittney N Miller
(74) *Attorney, Agent, or Firm* — Hogan Lovells US LLP (57) ABSTRACT

A transcoding service is described that is capable of utilizing the excess capacity of the computing resources of a service provider. The customer of the transcoding service can submit a bid price for completing the transcodes. As long as the specified price exceeds the fluctuating price of the unused resource instances, the transcoding service will execute the job on the unused instance(s). If the price of the unused resource instances exceeds the customer's bid, the transcoding process stops. The transcoding service may pause the transcoding when the dynamically fluctuating price of the unused resource exceeds the customer's bid and then resume when the price falls back down. Users can specify constraints for transcoding, such as timeframes during which the transcode must be completed, a total price for completing transcoding or priorities of the media files. The system can automatically optimize the utilization of the resource instances according to the constraints.

20 Claims, 6 Drawing Sheets

(51) Int. Cl.
*G06Q 30/06* (2012.01)
*H04L 29/08* (2006.01)
*H04L 12/911* (2013.01)

(58) Field of Classification Search
USPC .............................................. 705/26.3, 26.1
See application file for complete search history.

(56) References Cited

U.S. PATENT DOCUMENTS

| | | | |
|---|---|---|---|
| 6,970,602 | B1 | 11/2005 | Smith et al. |
| 7,231,023 | B1 | 6/2007 | Begeja |
| 7,761,900 | B2 | 7/2010 | Crayford |
| 7,958,532 | B2 | 6/2011 | Paul et al. |
| 8,634,705 | B2 | 1/2014 | Yogeshwar et al. |
| 8,855,189 | B1 | 10/2014 | Krause |
| 9,058,645 | B1 | 6/2015 | Corley et al. |
| 9,078,091 | B2 | 7/2015 | Lehriniemi et al. |
| 9,088,634 | B1 | 7/2015 | Corley et al. |
| 9,183,049 | B1 | 11/2015 | Corley |
| 9,189,484 | B1 | 11/2015 | Velummylum |
| 9,223,621 | B1 | 12/2015 | Corley |
| 9,292,896 | B1 | 3/2016 | Corley |
| 9,380,326 | B1 | 6/2016 | Coley |
| 9,483,785 | B1 | 11/2016 | Corley |
| 9,497,496 | B1 | 11/2016 | Corley |
| 9,710,307 | B1 | 7/2017 | Corley |
| 10,191,954 | B1 | 1/2019 | Corley |
| 2002/0150247 | A1 | 10/2002 | Linnartz et al. |
| 2002/0170035 | A1 | 11/2002 | Casati et al. |
| 2006/0168630 | A1 | 7/2006 | Davies |
| 2007/0002946 | A1 | 1/2007 | Bouton |
| 2007/0106622 | A1 | 5/2007 | Boomershine |
| 2007/0157260 | A1 | 7/2007 | Walker |
| 2007/0162945 | A1 | 7/2007 | Mills |
| 2007/0169113 | A1 | 7/2007 | Moore et al. |
| 2007/0174338 | A1 | 7/2007 | Liggett |
| 2008/0034393 | A1 | 2/2008 | Crayford |
| 2008/0081648 | A1 | 4/2008 | Kang |
| 2008/0146160 | A1 | 6/2008 | Jian et al. |
| 2008/0205510 | A1 | 8/2008 | Komi et al. |
| 2008/0242280 | A1 | 10/2008 | Shapiro |
| 2008/0301588 | A1 | 12/2008 | Kumar et al. |
| 2009/0043888 | A1* | 2/2009 | Jackson ................ G06F 9/468 709/225 |
| 2009/0083279 | A1 | 3/2009 | Hasek |
| 2009/0171674 | A1 | 7/2009 | Mitsumori |
| 2009/0172685 | A1 | 7/2009 | Shavit |
| 2009/0254672 | A1* | 10/2009 | Zhang ............. H04N 21/23106 709/231 |
| 2009/0276266 | A1 | 11/2009 | Nishiyama |
| 2009/0276716 | A1 | 11/2009 | Chua |
| 2010/0017516 | A1 | 1/2010 | Sparrell et al. |
| 2010/0054148 | A1 | 3/2010 | Murakami et al. |
| 2010/0054327 | A1 | 3/2010 | Capless |
| 2010/0076805 | A1 | 3/2010 | Batsakis et al. |
| 2010/0088505 | A1 | 4/2010 | Coppola et al. |
| 2010/0131674 | A1 | 5/2010 | Vecchio |
| 2010/0195540 | A1 | 8/2010 | Kerr et al. |
| 2010/0199299 | A1 | 8/2010 | Chang et al. |
| 2010/0205616 | A1 | 8/2010 | Lai et al. |
| 2010/0250710 | A1 | 9/2010 | Cadwell et al. |
| 2010/0281042 | A1 | 11/2010 | Windes et al. |
| 2010/0309794 | A1 | 12/2010 | Keynan et al. |
| 2010/0332262 | A1* | 12/2010 | Horvitz ................. G06F 9/5027 705/4 |
| 2011/0019870 | A1 | 1/2011 | Ballocca et al. |
| 2011/0082982 | A1 | 4/2011 | Harvell et al. |
| 2011/0088076 | A1 | 4/2011 | Li et al. |
| 2011/0153628 | A1 | 6/2011 | Basu et al. |
| 2011/0197221 | A1 | 8/2011 | Rouse et al. |
| 2011/0209162 | A1 | 8/2011 | Machiraju et al. |
| 2011/0310995 | A1 | 12/2011 | Dougherty, III |
| 2011/0313982 | A1 | 12/2011 | Kranendonk et al. |
| 2011/0314093 | A1 | 12/2011 | Sheu et al. |
| 2012/0030341 | A1 | 2/2012 | Jensen |
| 2012/0030376 | A1 | 2/2012 | Lemus |
| 2012/0072542 | A1 | 3/2012 | McGowan |
| 2012/0079054 | A1 | 3/2012 | Moroney |
| 2012/0089687 | A1 | 4/2012 | Katz |
| 2012/0102154 | A1 | 4/2012 | Huang et al. |
| 2012/0131591 | A1 | 5/2012 | Moorthi |
| 2012/0158645 | A1 | 6/2012 | Shafiee et al. |
| 2012/0159494 | A1 | 6/2012 | Shafiee et al. |
| 2012/0159503 | A1 | 6/2012 | Shafiee et al. |
| 2012/0192239 | A1 | 7/2012 | Harwell et al. |
| 2012/0209942 | A1 | 8/2012 | Zehavi et al. |
| 2012/0236201 | A1 | 9/2012 | Larsen et al. |
| 2012/0254456 | A1 | 10/2012 | Visharam et al. |
| 2012/0265847 | A1 | 10/2012 | Swenson et al. |
| 2012/0278441 | A1 | 11/2012 | Li et al. |
| 2012/0331089 | A1 | 12/2012 | Vonog |
| 2013/0019311 | A1 | 1/2013 | Swildens |
| 2013/0036117 | A1 | 2/2013 | Fisher |
| 2013/0054827 | A1 | 2/2013 | Feher et al. |
| 2013/0243075 | A1 | 9/2013 | Dalela |
| 2014/0115592 | A1 | 4/2014 | Frean |
| 2014/0359092 | A1 | 12/2014 | Middleton |

OTHER PUBLICATIONS

Non-Final Office Action issued in U.S. Appl. No. 14/801,784 dated Nov. 17, 2016.
Final Office Action issued in U.S. Appl. No. 14/801,784 dated Jun. 16, 2017.
Non-Final Office Action issued in U.S. Appl. No. 14/801,784 dated Mar. 26, 2018.
Final Office Action issued in U.S. Appl. No. 14/801,784 dated Sep. 5, 2018.
Non-Final Office Action issued in U.S. Appl. No. 14/801,784 dated Feb. 26, 2019.
Non-Final Office Action issued in U.S. Appl. No. 13/465,960 dated Oct. 26, 2017.
Final Office Action issued in U.S. Appl. No. 13/465,960 dated Jun. 18, 2018.
Non-Final Office Action issued in U.S. Appl. No. 15/362,617 dated Jun. 2, 2017.
Final Office Action issued in U.S. Appl. No. 15/362,617 dated Dec. 28, 2017.
Non-Final Office Action issued in U.S. Appl. No. 15/362,617 dated Jun. 19, 2018.
Non-Final Office Action issued in U.S. Appl. No. 15/362,617 dated Feb. 19, 2019.
Notice of Allowance issued in U.S. Appl. No. 13/465,978 dated Mar. 27, 2017.
Non-Final Office Action issued in U.S. Appl. No. 15/627,137 dated Nov. 28, 2018.
Final Office Action issued in U.S. Appl. No. 15/627,137 dated Mar. 18, 2019.
Notice of Allowance issued in U.S. Appl. No. 13/465,987 dated Apr. 11, 2017.
Non-Final Office Action issued in U.S. Appl. No. 13/465,987 dated Aug. 8, 2017.
Final Office Action issued in U.S. Appl. No. 13/465,987 dated Dec. 27, 2017.
Notice of Allowance issued in U.S. Appl. No. 13/465,987 dated Sep. 20, 2018.
Non-Final Office Action issued in U.S. Appl. No. 14/682,004 dated Jun. 5, 2015.
Notice of Allowance issued in U.S. Appl. No. 14/682,004 dated Mar. 3, 2016.
Wiley online book "Cloud Computing: Principles and Paradigms" (published Jan. 3, 2011) to Buyya et al. ("Buyya") (Year: 2011).
Non-Final Office Action issued in U.S. Appl. No. 13/465,931 dated Dec. 4, 2014.
Notice of Allowance issued in U.S. Appl. No. 13/465,931 dated Mar. 27, 2015.
Non-Final Office Action issued in U.S. Appl. No. 13/465,960 dated Oct. 22, 2015.

(56) References Cited

OTHER PUBLICATIONS

Final Office Action issued in U.S. Appl. No. 13/465,960 dated Jun. 3, 2016.
Non-Final Office Action issued in U.S. Appl. No. 13/465,975 dated Feb. 4, 2014.
Final Office Action issued in U.S. Appl. No. 13/465,975 dated Sep. 11, 2014.
Non-Final Office Action issued in U.S. Appl. No. 13/465,975 dated Jan. 16, 2015.
Final Office Action issued in U.S. Appl. No. 13/465,975 dated Sep. 8, 2015.
Notice of Allowance issued in U.S. Appl. No. 13/465,975 dated Aug. 3, 2016.
Non-Final Office Action issued in U.S. Appl. No. 13/465,978 dated Feb. 4, 2014.
Final Office Action issued in U.S. Appl. No. 13/465,978 dated Jul. 3, 2014.
Non-Final Office Action issued in U.S. Appl. No. 13/465,978 dated Jan. 29, 2015.
Final Office Action issued in U.S. Appl. No. 13/465,978 dated Aug. 27, 2015.
Non-Final Office Action issued in U.S. Appl. No. 13/465,978 dated Jul. 14, 2016.
Non-Final Office Action issued in U.S. Appl. No. 13/465,987 dated Apr. 2, 2013.
Final Office Action issued in U.S. Appl. No. 13/465,987 dated Oct. 24, 2013.
Non-Final Office Action issued in U.S. Appl. No. 13/465,987 dated Jul. 17, 2015.
Final Office Action issued in U.S. Appl. No. 13/465,987 dated Aug. 8, 2016.
Non-Final Office Action issued in U.S. Appl. No. 13/465,992 dated Jul. 29, 2014.
Final Office Action issued in U.S. Appl. No. 13/465,992 dated Feb. 23, 2015.
Non-Final Office Action issued in U.S. Appl. No. 13/465,992 dated Jul. 14, 2015.
Notice of Allowance issued in U.S. Appl. No. 13/465,992 dated Mar. 8, 2013.
Non-Final Office Action issued in U.S. Appl. No. 13/465,997 dated May 1, 2014.
Non-Final Office Action issued in U.S. Appl. No. 13/465,997 dated Oct. 21, 2014.
Notice of Allowance issued in U.S. Appl. No. 13/465,997 dated Feb. 4, 2015.
Non-Final Office Action issued in U.S. Appl. No. 13/466,002 dated Jan. 3, 2013.
Final Office Action issued in U.S. Appl. No. 13/466,002 dated Jul. 19, 2013.
Non-Final Office Action issued in U.S. Appl. No. 13/466,002 dated Sep. 23, 2014.
Final Office Action issued in U.S. Appl. No. 13/466,002 dated Aug. 8, 2015.
Non-Final Office Action issued in U.S. Appl. No. 13/466,002 dated Feb. 9, 2016.
Notice of Allowance issued in U.S. Appl. No. 13/466,002 dated Jul. 20, 2016.
Anonymous, Altair Introduces Advanced Scheduling Features with PBS Professional™ 9.2: Eligible time, tunable formula and standing reservations help customers achieve higher ROI, May 20, 2008, PR Newswire.
Newton, "API", Newton's Telecom Dictionary, $18^{th}$ Ed., Feb. 2002.
"Software" The Authoritative Dictionary of IEEE Standard Terms. $7^{th}$ ed. 2000 pp. 1067.
Non-Final Office Action issued in U.S. Appl. No. 13/465,944 dated Sep. 24, 2014.
Final Office Action issued in U.S. Appl. No. 13/465,944 dated Feb. 20, 2015.
Non-Final Office Action issued in U.S. Appl. No. 13/465,944 dated Jul. 31, 2015.
Final Office Action issued in U.S. Appl. No. 13/465,944 dated Mar. 31, 2016.
Notice of Allowance issued in U.S. Appl. No. 13/465,944 dated Jul. 20, 2016.
U.S. Non-Final Office Action issued in U.S. Appl. No. 15/362,617 dated Jun. 24, 2019.
U.S. Non-Final Office Action issued in U.S. Appl. No. 15/627,137 dated Jul. 25, 2019.
Examiner's Answer issued in U.S. Appl. No. 14/801,784 dated Nov. 22, 2019.
Non-Final Office Action issued in U.S Appl. No. 13/465,960 dated Sep. 18, 2019.

* cited by examiner

METHOD, SYSTEM, AND COMPUTER-READABLE STORAGE MEDIUM FOR UTILIZING EXCESS RESOURCE CAPACITY FOR TRANSCODING MEDIA

CROSS-REFERENCES TO RELATED APPLICATIONS

This application is a continuation of allowed U.S. application Ser. No. 13/465,944, entitled "UTILIZING EXCESS RESOURCE CAPACITY FOR TRANSCODING MEDIA," filed May 7, 2012; of which the full disclosure of this application is incorporated herein by reference for all purposes.

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

In some environments (e.g., cloud computing environments), multiple users can share resources (e.g., cloud resources) such as remote servers and data repositories, wherein the users can concurrently send multiple requests to be executed against the same resource. Problems can arise, however, since there is a limited amount of capacity for each type of resource. Conventional systems address these problems by providing dedicated resources to users and/or purchasing additional capacity, but such approaches are expensive and often result in unused excess capacity. Further, each resource can have more than one type of capacity, such as a compute capacity, a throughput limit, an available bandwidth, and other such aspects. Since conventional systems do not optimize the usage of various types of resource capacity for shared resources, there often is excess capacity in one or more of these capacity types even if one or more other types of capacity are being substantially fully utilized.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for processing content. In particular, the various embodiments provide approaches for transcoding or otherwise processing content, such as media content, by utilizing excess (e.g. unused) capacity of various computing resources in a multi-tenant computing environment (e.g. cloud computing environment).

Generally, transcoding often refers to the decoding and recoding of digital content from one format to another. Transcoding is sometimes necessary to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding can come from the vast range of devices, networks, and channels that may need to be supported.

In accordance with various embodiments, a transcoding service is described that is capable of utilizing the excess capacity of various resources, such as computing resources. In various embodiments, the resources can include but are not limited to server instances, virtual machines, bandwidth, memory or other resources that may be utilized for transcoding the media content. At least some of the resources can be supplied by a service provider. The service provider enables some users to reserve various types of resources, and enables other users to bid for unused capacity of those resources. By bidding on the excess capacity in this manner, users can schedule and perform tasks such as the transcoding of media files in a more cost effective manner, by taking advantage of resources that may have been reserved (e.g. for other users) but are not actually being used at a specific point or period of time.

In accordance with an embodiment, a customer of a transcoding service can select (bid) a price at which the customer is willing to have the transcodes completed. As long as that specified price at least meets or exceeds the current price for the unused resource instances (which may be dynamically changing due to market fluctuation), the transcoding service can execute the job on the unused resource instance(s). If the price of the unused resource instances begins to exceed the customer's bid, the transcoding process may suspend or terminate in at least some embodiments.

In accordance with an embodiment, a transcoding service may pause (suspend) when the dynamically fluctuating price of the unused resource exceeds the customer's bid and then start again when the resource price falls below the customer's bid price. In one embodiment, this involves saving the state of the transcoding process when the price exceeds the bid amount and then using that saved state to resume the transcoding once the price falls below the bid amount.

In accordance with an embodiment, a user can further specify a set of constraints for the transcoding and the transcoding service can perform optimization on those constraints. For example, the user may provide a timeframe during which the transcode must be completed and the system automatically optimizes the transcoding based on price so long as the specified timeframe is not exceeded. As another example, the user may specify a total price at which the transcoding must be completed and the system automatically optimizes the utilization of excess resource instances to perform the transcoding within the specified price.

In accordance with a further embodiment, the transcoding service may divide a media content file into a plurality of segments and then use parallel processing with a plurality of excess/unused resource instances to transcode the media file.

Figure 1:
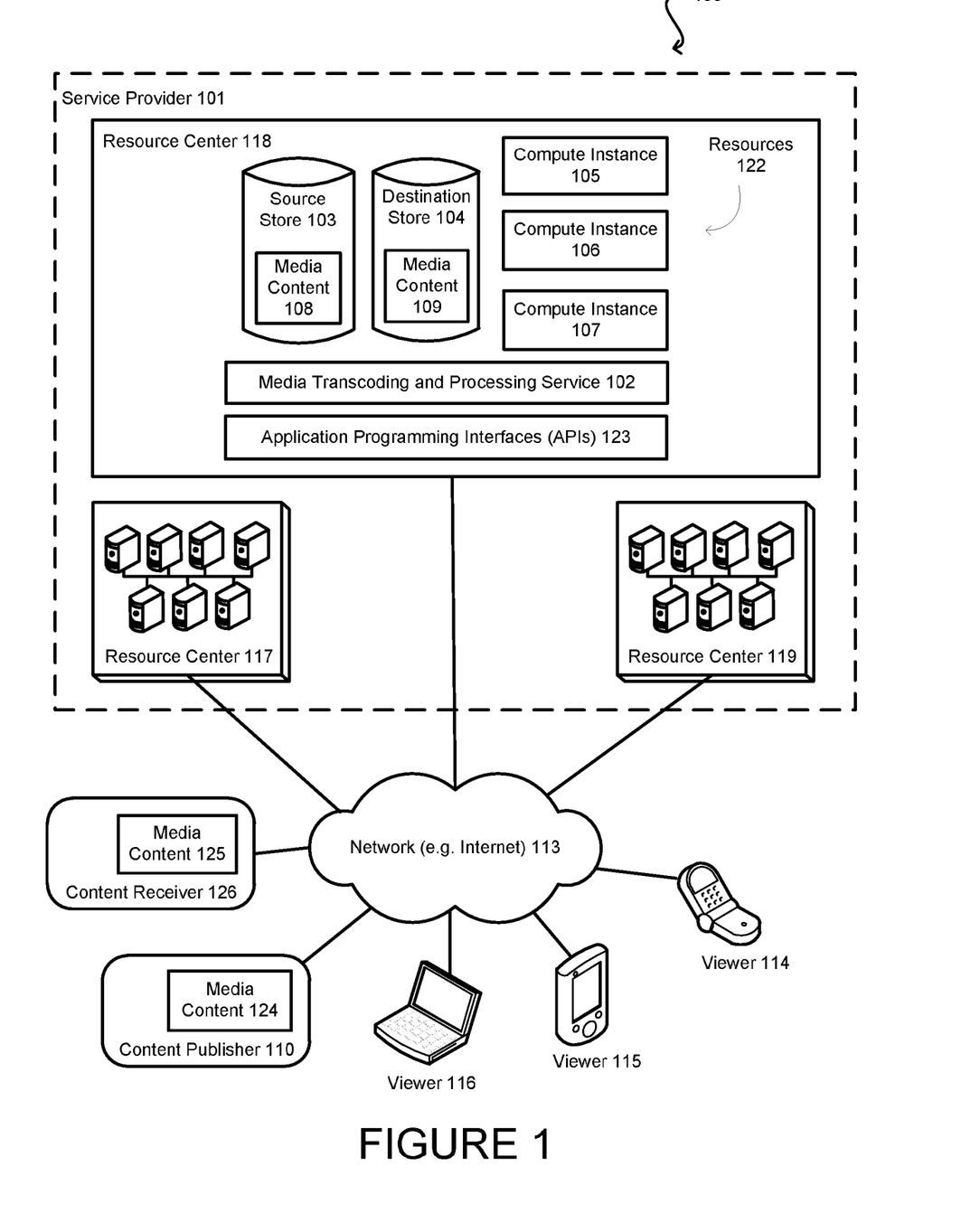
FIG. 1 is a general illustration of an environment in which the transcoding service can be utilized, in accordance with various embodiments.

FIG. 1 is a general illustration of an environment 100 in which the transcoding service can be utilized, in accordance with various embodiments.

As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other processing of content contained in this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using a service, such as a transcoding service. As one option, the pricing of a transcoding service could be based at least in part on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

Figure 2:
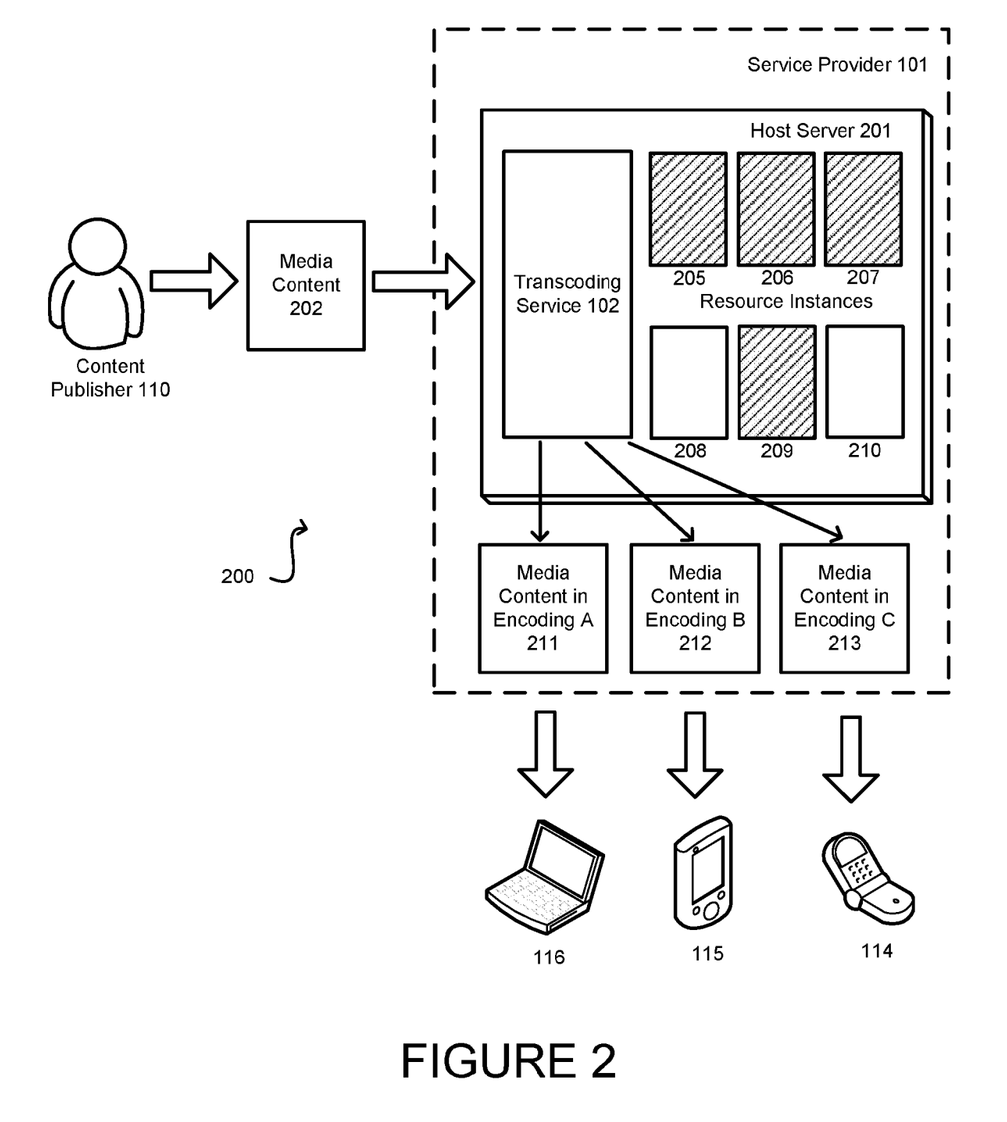
FIG. 2 is an example of an environment where transcoding service is utilizing unused capacity of resources to perform transcoding, in accordance with various embodiments.

FIG. 2 is an example of an environment 200 where transcoding service is utilizing unused capacity of resources to perform transcoding, in accordance with various embodiments.

As illustrated, a content publisher 110 may submit media content 202 (e.g. audio, video, multimedia file) to the service provider 101 for transcoding. For example, the media content 202 can be submitted by uploading a file to a storage location on a data store of the service provider 101. Alternatively, the file may be retrieved from a location on the content publisher's system. Once the media content 202 has been obtained, the content publisher may schedule a transcoding job to be performed with the transcoding service 102. In addition to submitting the media content 202, the content publisher 110 may specify a bid price for transcoding the media.

In accordance with an embodiment, the transcoding service 102 can transcode the media content 202 from one format or encoding to another. This can enable the media file to be viewed or rendered on a variety of different devices (114, 115, 116) and formats. In alternative embodiments, the transcoding service may perform a plurality of other processing of the media content, including but not limited to transmuxing the content, transrating, digital watermarking, segmenting, applying access controls, adding meta data, inserting advertisements, translating into various languages, transcribing, changing bit rates, sequencing, changing or adding audio associated with a video and others, as previously described.

In accordance with an embodiment, the transcoding service 102 can utilize the computing resources of the service provider to carry out the transcoding job. For example, the service provider 102 can provide a number of resource instances (205, 206, 207, 208, 209, 210) running one or more host servers 201. In accordance with an embodiment, the resource instances can be used to perform the transcoding of the media assets. In at least one embodiment, each resource instance can be a virtual computing instance (e.g. virtual machine) that is assigned to a particular user or customer. The service provider 102 can utilize the virtual instances to meter the customers' usage of its computing resources. In alternative embodiments, the resource instances can be mapped to actual computing resources maintained in a data center of the service provider.

In accordance with various embodiments, each computing resource instance (205, 206, 207, 208, 209, 210) can be reserved for use by a particular customer or other user for a defined period of time. During the time periods where that customer is not using the resource, at least some excess or otherwise unused resource capacity of that computing resource may be made available to other users on a temporary or non-guaranteed basis, such that the excess resource capacity can be allocated to other users until a time that the capacity is desired for other purposes (e.g., for preferential or reserved use). Such excess capacity may, for example, be made available as part of one or more general excess capacity pools that are available for use by various users, such as via a spot market with dynamically changing pricing to reflect supply and demand. In some cases, one or more programs may be executing on behalf of a user using excess resource capacity at the time that the excess resource capacity is desired for other purposes, and, in some such cases, the use of that excess capacity (e.g., storage for that user in the excess capacity) may be automatically terminated (e.g., deleted) by the computing resource in order to make that excess capacity available for the other purposes. In at least some embodiments, the user requests or operations can be automatically restarted at a future time, such as when a sufficient amount of excess capacity again becomes available for such purposes. Alternatively, other resource capacity may be identified and used in place of the excess resource capacity that is desired for the other purposes, so as to enable the operations relying on the excess resource capacity to continue to be processed or otherwise fulfilled.

Customers can utilize the unused or excess capacity from dedicated, reserved, or other such resource capacity. In accordance with an embodiment, customers can bid to use the excess capacity. For example, a customer can submit a transcoding request for an instance with a bid price and a specification of at least one resource guarantee to be provided for the request, such as a minimum throughput, compute capacity, etc. If a resource becomes available that meets the capacity requirement(s) for the instance request, if the bid exceeds any other requests (or otherwise has preference or priority), and if the bid at least meets a current market price for that capacity, the instance request can be processed using the excess capacity. In various embodiments, the customer with the winning bid will obtain dedicated use of that excess capacity for at least a period of time to process the transcoding operations associated with the instance created per the instance request. After that minimum time, the bid amount can be reexamined and, if the request no longer meets the winning criteria discussed above, or some other such criteria, fulfilling of the instance request for that user on that resource can be terminated (e.g., the instance can be terminated on that resource). Further, if the capacity is excess capacity reserved or dedicated to another user, the customer can be kicked off the resource at any time if the dedicated or reserved customer resumes using that resource.

In some embodiments, the excess resource capacity can include the bandwidth of one or more resources. For example, the service provider may wish to offload heavy traffic to time periods when the demand for bandwidth is lower in order to prevent overload. This can be used to reduce traffic peaks according to the time frame for transcoding. Similarly, if a content or bandwidth provider has excess resource capacity, the provider can increase bit-rates to fill the valleys (periods of low traffic). In that case, the benefit to increasing bit-rates would be to the consumer, by providing a higher quality experience. In accordance with another embodiment, if the content publisher has specified a time interval for transcoding the content, the system can determine a number of time periods of low demand during which it can offer a lower price for performing the transcoding. In various other embodiments, the excess resource capacity may include other factors, such as power, memory or any other resources that may be utilized for transcoding or content processing.

As illustrated in FIG. 2, at any given point in time, some of the resource instances may be in the process of being used (205, 206, 207, 209) to carry out the workload, while other resource instances are idle and not being used (208, 210). In accordance with an embodiment, the service provider 101 can provide an interface for customers to bid for and utilize the unused capacity of the resource instances. Depending on the availability of the unused capacity and the demand for the unused capacity by the various customers, the market price for the unused instances may be periodically fluctuating. In many cases, the market price for the unused capacity may be lower than the price of actually reserving the compute instances. For example, if reserving a resource instance costs 10 cents per hour for a customer, the market price for unused capacity of the resource instances may fluctuate between 5 and 8 cents per hour. During some time periods, however, the market price of unused capacity may even exceed the price of reserved instances, such as during times of high demand for additional capacity by some users. In any event, the market price of the unused capacity can often change depending on supply and demand.

In accordance with an embodiment, transcoding service 102 can utilize the excess capacity of the resource instances to carry out the transcoding job according to the bid price provided by content publisher 110. In one embodiment, the system continues to perform the transcoding of the media file while the bid price exceeds the market price for the unused capacity of the resource instances. In this embodiment, if the market price exceeds the bid price submitted by the customer, the system terminates or suspends the transcoding process. In one embodiment, the system can also enable a pause and resume feature, where the system pauses the transcodes whenever the market price for unused capacity exceeds the customer's bid price and then resumes transcoding whenever the market price falls below the bid price again. In this embodiment, the system can save the state of the transcoding process and later use the state to resume the transcoding.

In addition to specifying the bid price, the content publisher 110 may provide a number of input parameters to be used with transcoding. The parameters can include but are not limited to: a timeframe during which the transcoding must be completed, a maximum price that the customer is willing to pay to complete the transcoding, and a priority of the media file with respect to other media content of the customer. In accordance with an embodiment, the transcoding service can use these parameters to optimize the transcoding of the media content for the customer. If the customer provides a timeframe for completing the transcoding, the system can automatically optimize the usage of the resource instances to minimize the cost of the transcoding job according to the market price of the unused capacity. For example, the system may maintain a rolling average of the market price and if the specified timeframe is long enough, invoke the resource instances at times when the price for the unused capacity is low (e.g. periods of low demand such as nights, weekends, etc.). If the customer specifies a maximum price that they are willing to pay to have their media content transcoded, the system can carry out the transcoding job by utilizing the excess capacity of the resource instances as long as doing it will be within the total price specified by the customer. If the customer specifies a priority for the media file, the system can optimize how many resource instances to invoke to carry out the transcoding based on the priority. For example, if the priority of the media file is set to be very high, the service can invoke a large number of resource instances to execute the transcoding faster (costing more to the customer), while if the priority is set to low, the service can utilize fewer resource instances (e.g. a single instance) to carry out the transcoding for a cheaper overall cost to the customer.

In this manner, the transcoding service 102 can be utilized to encode the content publisher's media content into a plurality of different formats (211, 212, 213) suitable for display at different devices (114, 115, 116) and operating systems. The transcoding can be performed in an effective and more cost-efficient manner by utilizing the excess capacity of the compute resource instances.

Figure 3:
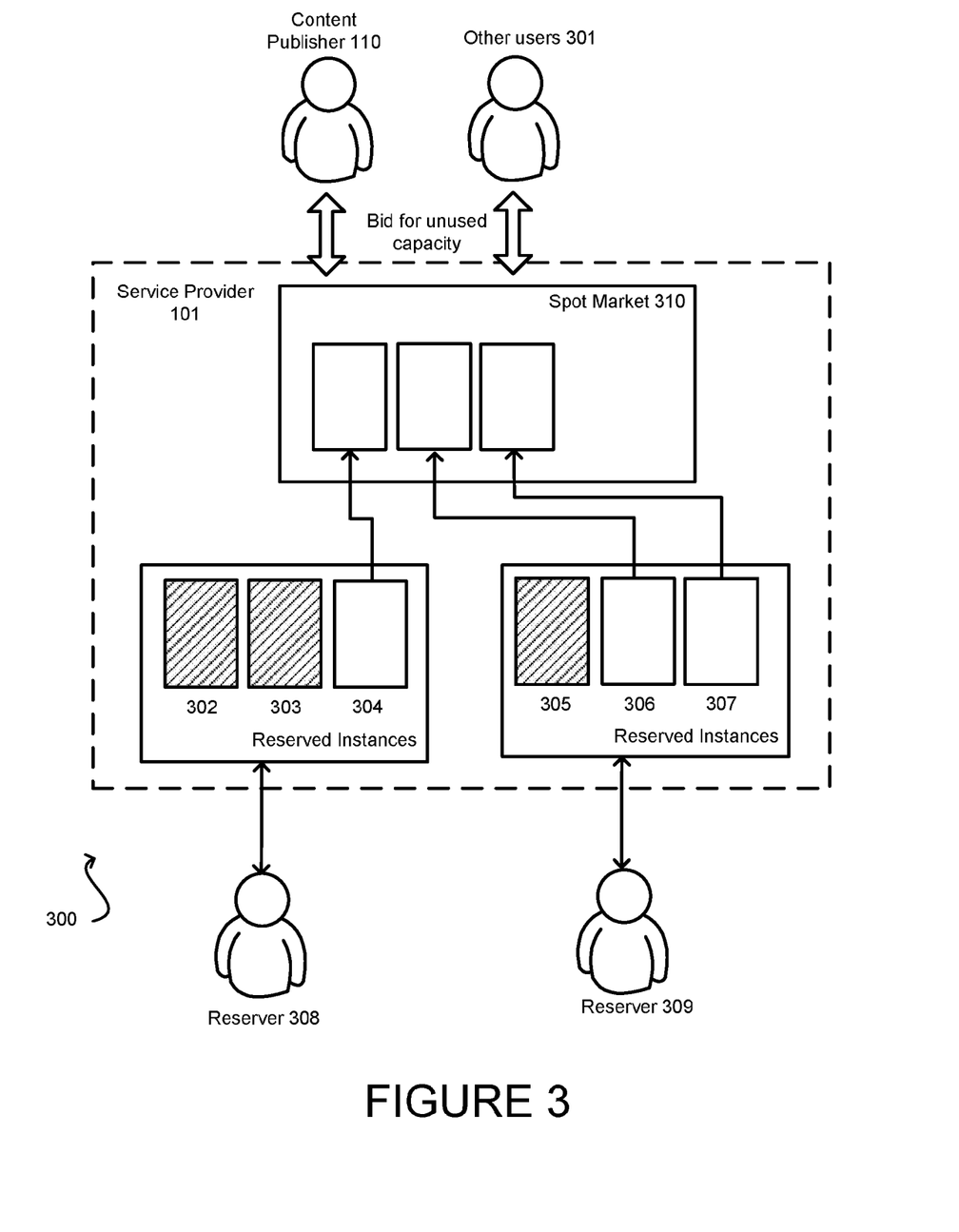
FIG. 3 illustrates an example of a spot market for unused transcoding capacity, in accordance with various embodiments.

FIG. 3 illustrates an example 300 of a spot market for unused transcoding capacity, in accordance with various embodiments.

In the illustrated embodiment, the service provider 101 creates a spot market 310 that enables various content publishers 110 and other users 301 to bid for unused transcoding resource capacity of the service provider 101. The spot market can take the form of a graphical user interface (GUI), console, application programming interface (API), a web application or any other component.

In accordance with an embodiment, the service provider 101 allows users to reserve resource instances for a specified period of time for a specific price. The resource instance can be any resource that provides some unit of computing or transcoding capacity, such as a virtual machine, server instance, or the like. For example, as shown in the illustrated embodiment, user 308 has reserved resource instances (302, 303, 304) and user 309 has reserved resource instances (305, 306, 307). During the time interval that the instances are reserved, the instances can be utilized by the reserving user (reserver) at any time.

In many instances, however, a reserving user may not always be using all of the resource instances reserved on their behalf. There may often be time periods in the reservation interval, during which some of the reserved instances are remaining idle and not performing any computation. In accordance with an embodiment, the spot market enables the service provider to utilize those idle instances to process transcoding jobs for other users, while still guaranteeing that the reserved instances will be ready to immediately begin processing jobs of the reserving user if the need for them should arise. For example, as shown in the illustrated embodiment, reserver 308 may be currently utilizing reserved instances 302 and 303, while instance 304 is sitting idle. Similarly, reserver 309 is using resource instance 305, while instances 306 and 307 are idle and not being used. In accordance with the illustrated embodiment, the currently unused instances (304, 306, 307) can be placed in the spot market 310, where other users (110, 301) are enabled to bid for these resource instances.

In accordance with an embodiment, the spot market 310 may accept bids for resource capacity from various users, such as the content publisher 110. Once the bid is received, the spot market can evaluate the bid and determine whether it exceeds the current spot market price. In accordance with an embodiment, the current spot market price fluctuates periodically according to supply and demand for resource instances in the spot market. If, at the time of receiving the user's bid, the bid exceeds the current spot market price, the service provider can begin executing the transcoding job using the spot market instances. The transcoding job can continue being executed for as long as the content publisher's bid exceeds the current spot price.

In accordance with an embodiment, if the spot market price rises above the bid, the transcoding job can be suspended and the state of the transcoding may be saved such that the job can be resumed later. As such, if the spot market price later again drops below the specified bid, the transcoding job can be resumed from where it was stopped, using the saved state.

In accordance with an embodiment, if the reserving users (308, 309) invoke any of the reserved instances that are currently in the spot market 310; those reserved instances may be immediately taken out of the spot market pool and provided to the reserver that requires it. For example, if reserver 308 invokes resource instance 304, any transcoding job being performed by resource instance 304 is suspended and the resource instance 304 begins to process the transcoding job requested by reserver 308. The transcoding job that was previously being performed resource instance 304 may be suspended or transferred to another available spot market instance, if the bid still exceeds the current spot market price at that time.

Figure 4:
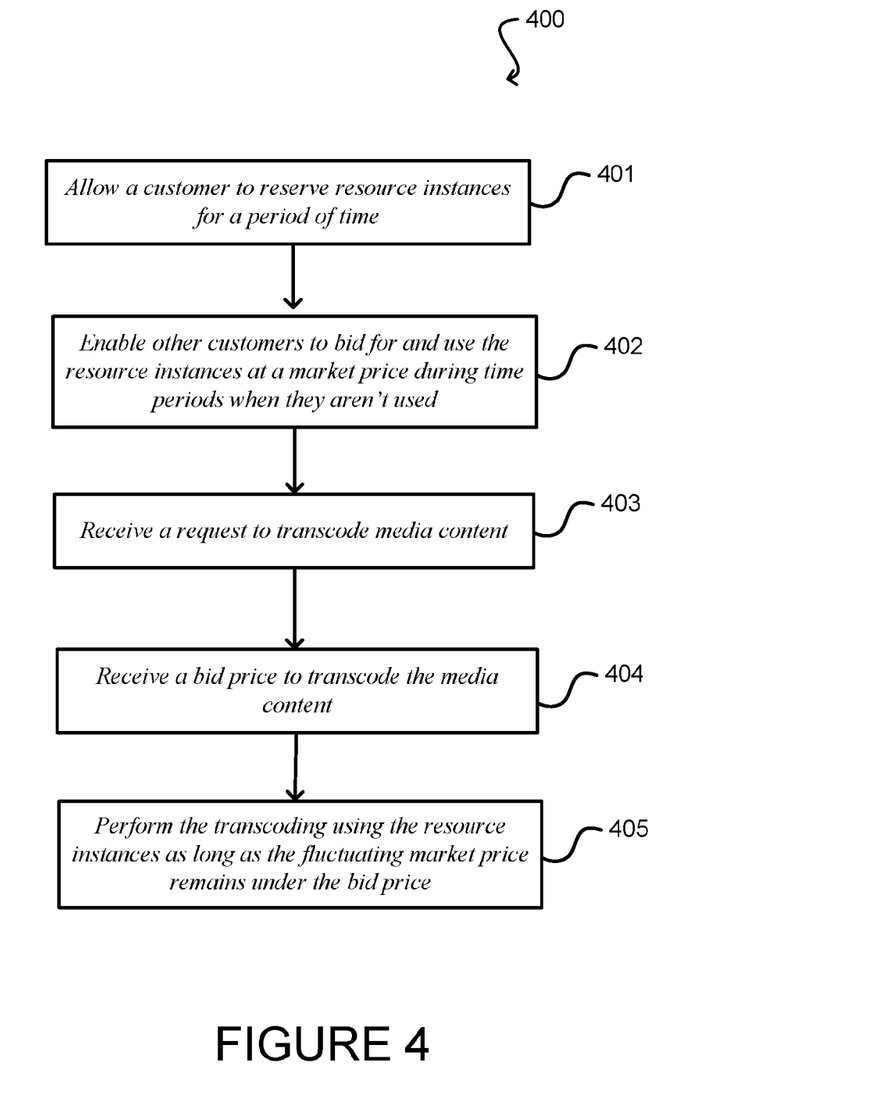
FIG. 4 illustrates an example process for utilizing excess resource capacity to perform transcoding of media content, in accordance with various embodiments.

FIG. 4 illustrates an example process 400 for utilizing excess resource capacity to perform transcoding of media content, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in operation 401, the service provider can allow a customer to reserve a set of resource instances for a defined period of time. For example, one customer (e.g. content creator, provider or distributor) can reserve 10 compute instances for one month to carry out its transcoding operations. The compute instances can be virtual machines or other units of compute capacity that can be used to measure the hardware utilization by the customer. In accordance with an embodiment, the compute instances can run the transcoding algorithms and processes to perform the encoding of the media to the particular desired format.

In operation 402, the service provider also enables other customers to bid for unused capacity of the compute instances. For example, during the periods of time when the customer that originally reserved the instances is not using them for processing workload, the resource instances remain unused. Rather than allowing them to remain idle in such a manner, the service provider can add them to a pool of resource instances that is sold to other customers that may wish to obtain access to resource capacity at a discount. If the preferred customer (i.e. customer that reserved the instances) then wants to use them again, the resource instances can be taken out of the pool and returned to the preferred customer.

In operation 403, the service provider may receive a request to transcode a set of media content. For example, one customer of the service provider may upload a media file and request that the media file be transcoded into a plurality of different encoding formats. The request can be provided by utilizing an interface of the transcoding service to schedule a transcoding job, or by some other means.

In operation 404, the customer can also specify a bid price to transcode the media content. For example, the customer may specify that the transcoding should be performed at the rate not exceeding X number of cents per minute. Alternatively, the customer may specify the total price that the transcoding should not exceed or other parameters as previously described.

In operation 405, the system performs the transcoding of the media content using the available capacity of the resource instances as long as the fluctuating market price of the capacity remains under (or equal to) the bid price. If the market price rises above the bid price, the transcoding can be temporarily stopped or terminated altogether. Subsequently, when the market price again returns to levels below the bid price, the transcoding can be resumed or restarted on the media content.

Figure 5:
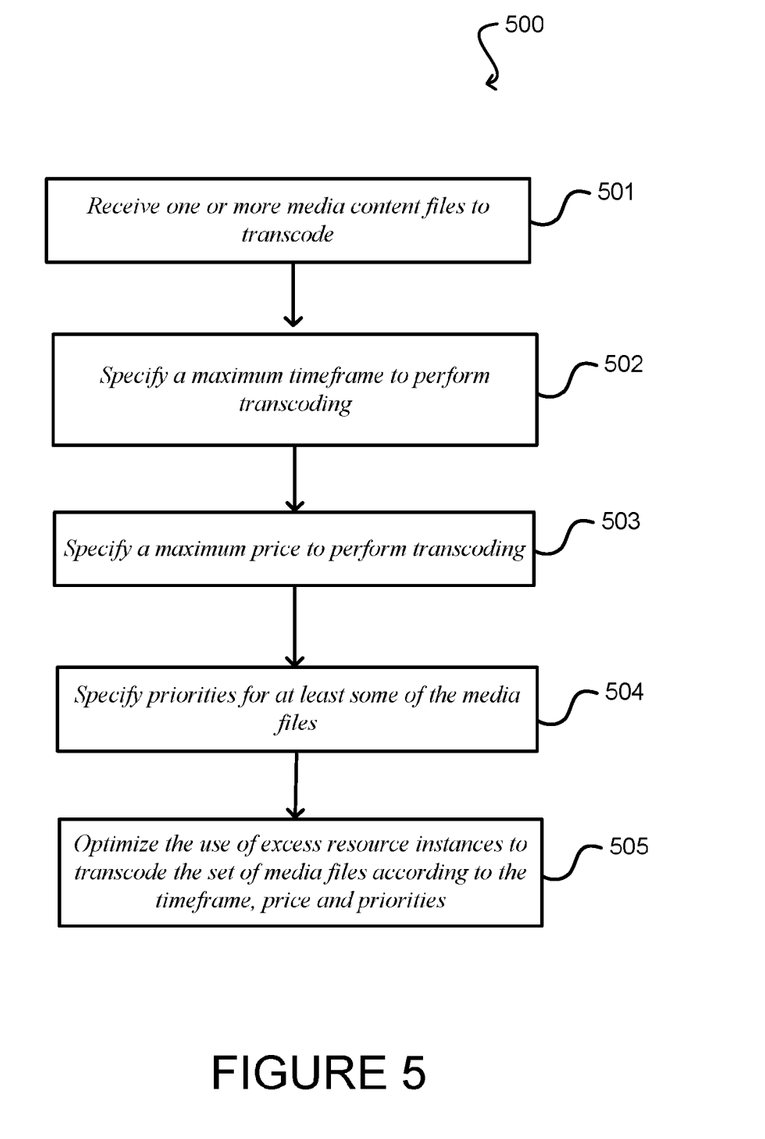
FIG. 5 is an example process of using input parameters to control the transcoding of media on resource instances, in accordance with various embodiments.

FIG. 5 is an example process 500 of using input parameters to control the transcoding of media on resource instances, in accordance with various embodiments.

As illustrated in operation 501, the service provider may receive a set of media content files to transcode. For example, a customer such as a content distributor may have a library of media files which it wishes to transcode into a particular new encoding format. The distributor may then upload or otherwise provide the service provider access to the library and instruct that all of the content therein be transcoded into the specified format(s).

In operation 502, the customer may optionally specify a maximum timeframe to perform the transcoding on the set of media content files that it provided. For example, the content distributor may specify that the entire library of media content should be transcoded in no longer than 24 hours from the start of the request. Of course the specified timeframes for completion can vary widely depending on various factors, such as the importance of providing the media in the new format to the content distributor and the like.

In operation 503, the customer may optionally specify a maximum price that it is willing to pay to transcode the entire library of media files. Alternatively, the customer may specify a price for each media file separately. For example, the content distributor can specify that it is willing to pay up to a certain amount to transcode all of its video files into a new format associated with a new device (e.g. tablet device set to release in the near future). Alternatively, the content distributor may specify higher prices for more popular videos (to transcode them faster) and lower prices for the less popular videos.

In operation 504, the customer may optionally specify the priorities for performing the media transcoding. For example, the content distributor may specify a particular priority for each video based on its popularity, likelihood of being accessed in the format being transcoded to, and the like. Alternatively, the content distributor may wish to set a high (or low) priority for the entire library of videos being transcoded to save costs or reduce the time taken to transcode and the like.

In operation 505, the system can read all of the input parameters and optimize the use of the resource instances to carry out the transcoding job according to those parameters. More specifically, the transcoding service can take into account the specified timeframe, max cost and any priorities associated with the media content to be transcoded. For example, if the customer specified a max timeframe for completing the transcoding, the system can automatically optimize the usage of the resource instances to minimize the cost of the transcoding job according to the market price of the unused capacity. Similarly, if the customer specified a maximum price to have their media content transcoded, the system can optimize the transcoding job to use the resource instances as long as doing so will be within the total price specified by the customer. Furthermore, if the customer specified priorities for the media files, the system can optimize how many resource instances to invoke to carry out the transcoding on each file based on those priorities, as previously described. In some embodiments, once the system receives the input parameters, it can analyze the available spot resources and provide information back to the user that submitted the parameters. For example, if the user specified a time interval for completing the transcoding, the system can quote (or estimate) a price for the entire transcoding job based on the current market price for excess capacity, or expected market price over the time interval and the like.

In some embodiments, the system may accept multiple bids or combinations of bids for performing the transcoding, each bid specifying different parameters. For example, a user may specify that if the transcoding can be performed within one hour, the customer is willing to pay one price and if the transcoding will not be performed within one hour, then the customer may specify a different price. Any permutation of bids and parameters are possible within the scope of the present disclosure.

Figure 6:
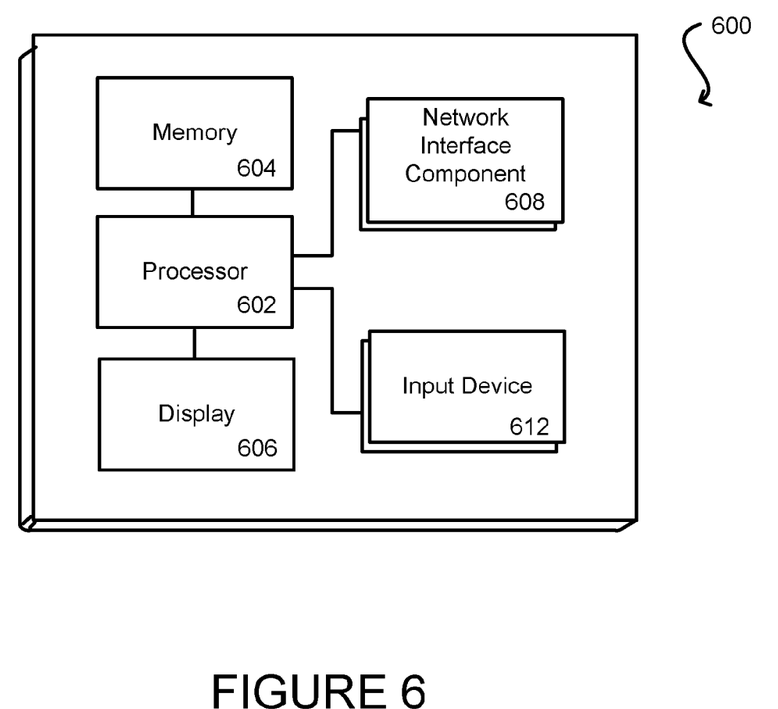
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   receiving, from a first computing device of a first customer, a request to reserve one or more resource instances;
   receiving, from a second computing device of a second customer, a request to transcode digital media content;
   determining at least one unused instance of the one or more resource instances reserved for the first customer and currently unused by the first customer; and
   transcoding, using the at least one unused instance, the digital media content for the second customer based at least in part upon whether the first customer has not invoked the at least one unused instance.

2. The method of claim 1 further comprising:
   receiving, from the first computing device of the first customer, a request to use the at least one unused instance;
   suspending the transcoding of the digital media content using the at least one unused instance; and
   saving a state associated with the transcoding of the digital media content.

3. The method of claim 2, further comprising:
   restarting the transcoding of the digital media content when at least one second unused instance becomes available for performing transcoding jobs.

4. The method of claim 1, further comprising:
   transcoding one or more portions of the digital media content in parallel using a plurality of unused instances of the one or more resource instances.

5. The method of claim 1, further comprising:
   uploading the digital media content from the second computing device of the second customer to a storage location on a data store of a service provider.

6. The method of claim 1, further comprising:
   receiving, from the second customer, a set of constraints including at least one of: a priority assigned to the digital media content, a bid price, a total maximum price for transcoding the digital media content, or a maximum timeframe for transcoding the digital media content; and
   transcoding, using the at least one unused instance, the digital media content based on the set of constraints.

7. The method of claim 1, wherein transcoding, using the at least one unused instance, the digital media content includes performing one or more of:
   transcoding the digital media content from a first digital media format into a second digital media format;
   transmuxing the digital media content;
   digital watermarking the digital media content;
   segmenting the digital media content;
   applying access controls to the digital media content;
   adding meta data to the digital media content;
   inserting advertisements into the digital media content;
   translating the digital media content into a different language;
   transcribing the digital media content;
   changing bit rates of the digital media content;
   sequencing the digital media content; or
   adding audio to the digital media content.

8. A system, comprising:
   at least one processor; and
   at least one memory including instructions that, when executed, cause the system to:
      receive, from a first computing device of a first customer, a request to reserve one or more resource instances;
      receive, from a second computing device of a second customer, a request to transcode digital media content;
      determine at least one unused instance of the one or more resource instances reserved for the first customer and currently unused by the first customer; and
      transcode, using the at least one unused instance, the digital media content for the second customer based at least in part upon whether the first customer has not invoked the at least one unused instance.

9. The system of claim 8 wherein the instructions, when executed, further cause the system to:

receive, from the first computing device of the first customer, a request to use the at least one unused instance;

suspend the transcoding of the digital media content using the at least one unused instance; and save a state associated with the transcoding of the digital media content.

10. The system of claim 9 wherein the instructions, when executed, further cause the system to:

restart the transcoding of the digital media content when at least one second unused instance becomes available for performing transcoding jobs.

11. The system of claim 8 wherein the instructions, when executed, further cause the system to:

transcode one or more portions of the digital media content in parallel using a plurality of unused instances of the one or more resource instances.

12. The system of claim 8 wherein the instructions, when executed, further cause the system to:

upload the digital media content from the second computing device of the second customer to a storage location on a data store of a service provider.

13. The system of claim 8 wherein the instructions, when executed, further cause the system to:

receive, from the second customer, a set of constraints including at least one of: a priority assigned to the digital media content, a bid price, a total maximum price for transcoding the digital media content, or a maximum timeframe for transcoding the digital media content; and transcode, using the at least one unused instance, the digital media content based on the set of constraints.

14. The system of claim 8, wherein the instructions to transcode, using the at least one unused instance, the digital media content, when executed, further cause the system to perform one or more of:

transcoding the digital media content from a first digital media format into a second digital media format;

transmuxing the digital media content;

digital watermarking the digital media content;

segmenting the digital media content;

applying access controls to the digital media content;

adding meta data to the digital media content;

inserting advertisements into the digital media content;

translating the digital media content into a different language;

transcribing the digital media content;

changing bit rates of the digital media content;

sequencing the digital media content; or adding audio to the digital media content.

15. A non-transitory computer readable storage medium, including instructions stored thereon which, when executed by at least one processor, cause the at least one processor to perform steps of:

receiving, from a first computing device of a first customer, a request to reserve one or more resource instances;

receiving, from a second computing device of a second customer, a request to transcode digital media content;

determining at least one unused instance of the one or more resource instances reserved for the first customer and currently unused by the first customer; and transcoding, using the at least one unused instance, the digital media content for the second customer based at least in part upon whether the first customer has not invoked the at least one unused instance.

16. The non-transitory computer readable storage medium of claim 15 wherein the instructions, when executed further cause the processor to perform steps of:

receiving, from the first computing device of the first customer, a request to use the at least one unused instance;

suspending the transcoding of the digital media content using the at least one unused instance; and saving a state associated with the transcoding of the digital media content.

17. The non-transitory computer readable storage medium of claim 16 wherein the instructions, when executed further cause the processor to perform a step of:

restarting the transcoding of the digital media content when at least one second unused instance becomes available for performing transcoding jobs.

18. The non-transitory computer readable storage medium of claim 15 wherein the instructions, when executed further cause the processor to perform a step of:

transcoding one or more portions of the digital media content in parallel using a plurality of unused instances of the one or more resource instances.

19. The non-transitory computer readable storage medium of claim 15 wherein the instructions, when executed further cause the processor to perform a step of:

uploading the digital media content from the second computing device of the second customer to a storage location on a data store of a service provider.

20. The non-transitory computer readable storage medium of claim 15 wherein the instructions, when executed further cause the processor to perform steps of:

receiving, from the second customer, a set of constraints including at least one of: a priority assigned to the digital media content, a bid price, a total maximum price for transcoding the digital media content, or a maximum timeframe for transcoding the digital media content; and transcoding, using the at least one unused instance, the digital media content based on the set of constraints.

* * * * *